United States Patent [19]

Puthenpura et al.

[11] Patent Number: 5,115,391
[45] Date of Patent: May 19, 1992

[54] KALMAN FILTER-BASED OPTIMIZER AND METHOD AND OPTIMIZING

[75] Inventors: Sarat C. Puthenpura, Jackson; Lakshman P. Sinha, East Brunswick, both of N.J.

[73] Assignee: AT&T Bell Laboratories, Murray Hill, N.J.

[21] Appl. No.: 471,175

[22] Filed: Jan. 26, 1990

[51] Int. Cl.$^5$ ............................................. G06F 15/20
[52] U.S. Cl. .................................. 364/152; 364/164; 364/154
[58] Field of Search ............... 364/148, 152, 153, 154, 364/164, 165, 402

[56] References Cited

U.S. PATENT DOCUMENTS

| | | | |
|---|---|---|---|
| 4,744,026 | 5/1988 | Vanderbei | 364/402 |
| 4,744,027 | 5/1988 | Bayer et al. | 364/402 |
| 4,744,028 | 5/1988 | Karmarkar | 364/402 |
| 4,885,686 | 12/1989 | Vanderbei | 364/402 |
| 4,894,773 | 1/1990 | Lagarias | 364/402 |
| 4,914,563 | 4/1990 | Karmarkar et al. | 364/148 |
| 4,914,615 | 4/1990 | Karmarkar et al. | 364/754 |
| 4,924,386 | 5/1990 | Freedman et al. | 364/402 |

OTHER PUBLICATIONS

Kalman, R. E., "A New Approach to Linear Filtering and Prediction Problems", 1960.
Anstor and Wittenmark, "Computer Controlled Systems", Prentice-Hall, 1984, pp. 259-261.
Freedman, B. A. et al., "A New Karmarkar-Based Algorithm for Optimizing Convex, Non-Linear Cost Functions with Linear Constraints", Tokyo, Japan, Aug. 29-Sep. 2, 1988.
Patent application Ser. No. 07/094631 filed Sep. 4, 1987.
Patent application Ser. No. 07/237264 filed Aug. 28, 1988.

Primary Examiner—Jerry Smith
Assistant Examiner—Paul Gordon
Attorney, Agent, or Firm—Henry T. Brendzel

[57] ABSTRACT

Making use of the conceptual and computational similarities between the Karmarkar method and the Kalman filter a controller system is capable of handling the observer function, the minimum time controller function and the minimum energy controller function. The system includes an element that has the computational structure of a Kalman filter. The inputs of this element are qualitatively controlled to deliver the desired results to the remaining computation elements. In a controller for an LP control task, the element develops the dual vector signal used in the affine scaling algorithm by applying information to it as if its task were to estimate the states of a system whose observable output is $D_{x(k)}c$, the input is O, the observation noise covariance matrix R is close to zero, the transition matrix is I and the matrix that describes the relationship between the measurable parameters and the observable output is $A^T D_{x(k)}$. Different controls applied to the Kalman filter structure element (and to the other elements of the system) yield control signals for QP control tasks.

12 Claims, 6 Drawing Sheets

KALMAN FILTER-BASED OPTIMIZER AND METHOD AND OPTIMIZING

BACKGROUND OF THE INVENTION

Field of the Invention

This invention relates to the control of processes or systems in order to meet, maximize, or minimize specified performance criteria. More particularly, this invention relates to method and apparatus for optimizing a selected performance criterion of the process or system under control, such as the criterion of optimizing resource allocation costs.

Stochastic Systems

According to the state space concept of systems, the dynamics of a given system or process can be completely described in terms of the "states" of the system or process. For example, the dynamics of an electric motor can be described in sufficient detail by the angular displacement, the angular velocity, and the angular acceleration of its rotating shaft. The various sets of values of these three parameters can be thought of as the states of the system. These parameters may be directly measurable (such as the speed measured with a tachometer) or may be indirectly measurable, and control of systems can be based on those measurements. Alas, the observed measurements may be corrupted by operational and measurement noise. Systems that include such noise components are typically referred to as stochastic systems.

Stochastic systems can be controlled with an approach that comprises an observer system and a separate observer-responsive controller system. The concept is to deduce the states of the system under consideration by using an observer system and then to synthesize a control signal strategy that would control and consequently change the output of the system based on the observed states. The observer system estimates the various states of the system from transducer-provided samples of inputs and outputs of the system. For example, in observing the states of a chemical process, thermocouples can measure the temperatures in different parts of a chemical plant to give an indication of the states of the chemical plant.

The stochastic aspect of systems comes from the fact that, in most real systems, uncertainties are involved in the measurement of the systems' states. These uncertainties are commonly referred to as "measurement noise". There could also be system disturbances caused by the operating environment. These disturbances may simply arise from inaccuracies or incompleteness of the model that describes the system. Such disturbances are commonly referred to as "process noise" or "system noise". An example would be the unexpected changes in atmospheric pressure for an autopilot system. Though weather (and atmospheric pressure being one component thereof) may be deterministic, it is so complex and subject to so many variables that for all practical purposes, we say that the atmospheric pressure has a "system noise" component.

In handling the observations of stochastic systems artisans have typically employed the Kalman filter as a stochastic observer (Kalman, R. E., "A New Approach to Linear Filtering and Prediction Problems", Transactions of the A.S.M.E., Journal of Basic Engineering, Vol. 82, pp. 35-45, 1960). The Kalman filter, as the name implies, filters out the stochastic component of the observed parameters and outputs the expected value of those parameters.

The most common approach to dealing with stochastic control tasks (when analyzing such tasks) is to use a linear model to represent the system or process to be controlled, to use a quadratic performance criterion, and to assume that the observation noise is normally distributed (Gaussian). A quadratic performance criterion minimizes the sum of the squares of the differences between the actual states and the desired states. Control tasks that are modeled in this manner are sometimes called "minimum fuel" problem. The name derives from the fact that a control strategy for reaching the terminal states (and hence the desired output) with the minimum expenditure of energy is always a function of a quadratic performance criterion (cost function). Such problems are also characterized as QP (quadratic programming) problems.

Perhaps one reason why "minimum fuel" modeling is the most commonly used approach in dealing with stochastic process control tasks is that an optimal control strategy for the "minimum fuel" problem can be obtained within the observer-responsive controller system by dynamic programming (DP). The DP technique is described, for example, by Anstor and Wittenmark, in "Computer Controlled Systems", Prentice-Hall, 1984, pp. 259-261. Since it can be shown that optimization by DP has the same computational structure as that of the Kalman filter (e.g., see pp. 274-275 in the above-identified Anstor et al. reference), it follows that a Kalman filter can be used as the controller of the process or system under control. In other words, when a Kalman filter is designed and built for the observer system, the observer-responsive controller system can use the same hardware or software when handling problems that can be solved by DP; that is, problems where the cost function is quadratic. This substantially reduces the cost of developing the overall controller system, whether it is implemented in hardware or in software (i.e., in a stored program controlled processor).

FIG. 1 presents the prior art control arrangement of a stochastic system. It includes a representation of the system under control and the control apparatus. The symbolic representation of the "system under control" encompasses noise-free system 10, process noise 11 and observation noise 12. Process noise 11 is applied to system 10, the observation noise is added to the output of system 10 via adder 14, and the result forms the observable output 13 of the system.

Observer system 20 is responsive to output 13. It develops an estimate of the state of system 10. That is the Kalman filter. The estimate developed by the Kalman filter is applied to observer-responsive controller system 30 which develops the control signals for improving the a prior selected performance criteria of system 10. Lastly, the control signals are applied to system 10 to force it in the direction that improves the aforementioned performance criteria.

System 10 can be a simple servo motor system but it certainly can be more complicated as well. It can be a chemical plant whose energy use one wishes to optimize, an airline enterprise whose fuel consumption one wishes to optimize, a communications enterprise whose transmission capacity one wishes to utilize efficiently, etc.

The following presents the prior art Kalman filter process in mathematical detail. The mathematical treatment permits a more precise description of the control process, it offers a basic understanding of the mathematical underpinning in prior art apparatus, it helps to explain the details of FIG. 1, and it enhances the detailed description of this invention.

THE KALMAN FILTER

A general multivariable stochastic, discrete and time invariant system with m inputs and k outputs can be represented by $$z(t+1) = Fz(t) + Gu(t) + v(t) \quad (1a)$$

$$y(t) = Hz(t) + e(t) \quad (1b)$$

where
- $z(t)$ is an n dimension state vector,
- F is an $n \times n$ state transition matrix,
- G is an $n \times m$ input matrix,
- H is a $k \times n$ output matrix
- $u(t)$ is an m dimensional control input vector,
- $v(t)$ is an n dimensional system noise,
- $y(t)$ is a k dimensional measured output, and
- $e(t)$ is a k dimensional measurement noise.

For many applications it is reasonable to assume that the noise components $v(t)$ and $e(t)$ are independent Gaussian distributions having 0 expected values ($E[v(t)] = 0$ and $E[e(t)] = 0$) and covariance matrices Q (order $n \times n$) and R (order $k \times k$), respectively.

In the above expressions, the vector $z(t+1)$ has n components and each component represents one of the observable attributes of system 10. This can be temperature, pressure, weight, acceleration, etc. Taking the components as a group, the vector $z(t+1)$ represents the state of system 10 at time $t+1$. The vectors $u(t)$ and $y(t)$ are the system inputs and outputs respectively. That is, $u(t)$ is the set of input signals at time t that are applied to system 10, and $y(t)$ is the set of output signals at time t that appear on line 13. The matrix F describes the input/output relationships of the system. In the absence of input and noise, the matrix F describes the movement of the system from the a state at time t, i.e., $z(t)$, to a state at time $t+1$, i.e., $z(t+1)$. The matrix G describes the effect of an input signal on the various components of $z(t)$, and the matrix H describes the relationship between the observable parameters and the actual output of the system, $y(t)$.

Employing the above representations, the states of system 10 in the presence of noise components 11 and 12 can be estimated by using a Kalman filter 20. It can be shown that the filter provides minimum variance estimates of the state $z(t)$ of system 10 (i.e., minimizes the norm $\| z(t) - \hat{z}(t) \|^2$).

While summarizing the known Kalman filtering process, in the equations that follow $\hat{z}(t_1/t_2)$ is used to denote the estimate of z at time $t_1$ that is obtained by making use of measurements made up to and including time $t_2$.

To start the filtering process with a Kalman filter, the values of matrices F, H, G, R and Q are installed in the filter and, at time $t=0$, the state estimate $z(0/0)$ is set to a reasonable value (or to zero) and P (0/0) is set to mI, where m is a large positive real number and I is the identity matrix. Thereafter, the Kalman filtering proceeds as follows:

1. Predict state at times t based on previous estimate at time $t-1$ $$\hat{z}(t/t-1) = F\hat{z}(t-1/t-1) + Gu(t-1) \quad (2a)$$

2. Estimate the covariance of the predicted state by evaluating $$P(t/t-1) = FP(t-1/t-1)F^T + Q \quad (2b)$$

3. Compute the Kalman gain matrix
$$K(t) = P(t/t-1)H^T(HP(t/t-1)H^T + R)^{-1} \quad (2c)$$

4. Measure observed output $y(t)$

5. Estimate filtered state from prediction and observed output $$\hat{z}(t/t) = \hat{z}(t/t-1) + K(t)[y(t) - H\hat{z}(t/t-1)] \quad (2d)$$

6. Estimate the covariance of the filtered state $$P(t/t) = [I - K(t)H]P(t/t-1) \quad (2e)$$

7. Determine whether to continue with another iteration by executing the branch

IF $(E[y(t) - H\hat{z}(t/t-1)] = 0$ and
$E[(y(t) - H\hat{z}(t/t-1)) \cdot \hat{z}(t/t)] = 0)$ \quad (2f)

THEN exit.
ELSE go to step 1.

Once the states are estimated by the above-described process, the minimum energy problem is solved by dynamic programming techniques.

The above-described Kalman filtering procedure may be carried out in the system of FIG. 1 with the circuitry depicted within block 20. Within block 20, the observable output, $y(t)$, is stored in memory 21 and the input, $u(t)$, is stored in memory 22. Memories 21 and 22 store a select number of the latest samples of $y(t)$ and $u(t)$. The number of stored samples affects the Kalman filter by fixing the "history" span on which the estimates developed by the filter are based. This span is also called "the control horizon." These samples are accessed under control of the test & control block 23 (the control path is not shown in FIG. 1 to reduce complexity) and applied to processors 24 and 25. That is, the retrieved input samples are applied to processor 24, and the retrieved observed output samples are applied to processor 25. As indicated above, Kalman filter 20 receives characterizing information about system 10 "off line", and that information is stored in the memory blocks marked F, H, G, Q, and R (corresponding to the information stored therein). Processor 24 develops a signal representative of equation (2a), processor 26 develops a signal representative of equation (2b), processor 27 develops a signal representative of equation (2c), processor 25 develops a signal representative of equation (2d), and processor 28 develops a signal representative of equation (2e). Registers 31 and 32 provide a one sample delay to yield signals $P(t-1/t-1)$ and $z(t/t-1)$ and deliver their output to processors 24 and 26, respectively. Under control of block 23, the signals of registers 31 and 32 combine with the signals of memories 21 and 22 (and all the processing in between) to form an estimate of the state of system 10. When control block 23 determines in accordance with equation (2f) that the iterations can stop, gate 33 permits the estimated output of system 10 to exit Kalman filter 20. The estimated system state of filter 20 is then applied to controller 30 to develop control signals for affecting the operation of system 10.

The Kalman filter of FIG. 1 can be implemented in a number of ways. The two primary techniques are special purpose hardware and program controlled general purpose processor hardware. The latter approach has become more economical in recent years because of the lower cost and higher speeds of general purpose processors.

The computations required of most of the processors in FIG. 1 are quite straight forward. The only exception is processor 27 that creates the signal that corresponds to equation (2c). It needs routines for the matrix inversion; but such routines are readily available in the art.

CONTROLLER 30

As indicated above, observer-responsive controller 30 is often implemented through dynamic programming. Its operation is outlined below for sake of completeness, though more complete descriptions are available in the art, as indicated above. Obtaining the signals for controlling system 10 in accordance with dynamic programming techniques proceeds along the following lines. Since it is known that the system under control moves from one state to another state in response to a driving signal, it follows that each state leads to a number of other states, depending on the value of the driving signal. The objective, then, is to move the system from its given initial state, through intermediate starts, to a goal state, at the least cost.

This is accomplished by evaluating the cost of moving from the initial state of the system to all subsequent states, and storing those costs. This includes the states that the system can reach only via other states as well as the states that the system can reach directly. Thereafter, the optimum path for reaching the goal state is determined by working backwards. To wit, starting from the goal state, the procedure is to select the link that leads to the state which possesses the lowest (stored) cost. Working from the selected state, still backwards, the path is identified iteratively all the way back to the given initial state of the system. When the mathematical equations for the above process are worked out, the closed form expressions for the control signal have a structure that is identical to that of the Kalman filter.

THE KARMARKAR ALGORITHM

In connection with noise-free control systems, recent years have seen tremendous improvement in the solution of control tasks in systems with linear constraints. The work in the field was spurred on by the seminal "interior point" invention disclosed by Karmarkar in U.S. Pat. No. 4,744,028 issued May 10, 1988. Typically, these LP (linear programming) problems are structured in terms of minimize $c^T x$
subject to $Ax = b$
and $x \geq 0$ where A includes the system constraint coefficients, x represents the parameters of the system that are altered to optimize the operation of the system under control, b represents the limits on the parameter values, c represents the cost coefficients and superscript T indicates a transpose. The affine scaling LP algorithm that follows the Karmarkar insights (see also Vanderbei, U.S. Pat. No. 4,744,026 issued May 10, 1988) can be summarized as follows.

The relationship $Ax = b$ can be viewed as a polytope in multidimensional space. When $x(k)$ is an interior point within the polytope (i.e. a feasible solution of the LP problem) at iteration k of the affine scaling algorithm, and $D_{x(k)}$ is the diagonal matrix containing the components of $x(k)$, then the translation vector $c_p(k)$ that directs the movement of the system from $x(k)$ to a new feasible point $x(k+1)$ is given by $$c_p(k) = -\frac{\alpha}{\gamma} D_{x(k)}^2 r(k) \tag{3a}$$

and the new feasible point is given by $$x(k+1) = x(k) - \frac{\alpha}{\gamma} D_{x(k)}^2 r(k), \tag{3b}$$

where $$r(k) = (c - A^T w(k)) \tag{3c}$$

$$w(k) = (A D_{x(k)}^2 A^T)^{-1} A D_{x(k)}^2 c \tag{3d}$$

$$\gamma = \max_i (e_i P(k) D_{x(k)} c) \tag{3e}$$

and $$P(k) = I - D_{x(k)} A^T (A D_{x(k)}^2 A^T)^{-1} A D_{x(k)}. \tag{3f}$$

The vector $e_i$ is i-th unit vector, which is a vector of all 0s except for a 1 in the $i^{th}$ component thereof. The parameter $\alpha$ is a scalar between 0 and 1.0, the vector $r(k)$ is called the reduced costs vector, and the vector $w(k)$ is called the dual vector. Equations (3e) and (3b) can also be written as $$\gamma = \max_i [e_i D_{x(k)} (c - A^T w(k))] \tag{4a}$$

and $$x(k+1) = x(k) - \frac{\alpha}{\gamma} D_{x(k)}^2 (c - A^T w(k)) \tag{4b}$$

where $A^T$ is the transpose of matrix A.

With each iteration of the affine scaling algorithm where a new feasible point is evaluated, a test is performed to determine whether an additional iteration is necessary. If it is, the newly developed $x(k+1)$ becomes the new $x(k)$ and the process repeats. When it is determined that additional iterations are no longer necessary, the value of $x(k)$ is transmitted to the system that is being controlled. Lastly, when the iterations terminate, the parameters of the system under control are set to the values suggested by the received $x(k)$, to thereby optimize system performance. The test for terminating the iterations is:

$$r(k) \geq 0$$

and $$x(k) \cdot r(k) \geq 0. \tag{4c}$$

Like the iterative process carried out within the Kalman filter of FIG. 1, the above-described affine scaling algorithm is implementable with modules that iteratively perform processing to develop signals corresponding to equations 3 and 4. More specifically, the affine scaling processor is sometimes implemented with modules that store the A, c and b information (somewhat akin to the memory modules that receive the F information in FIG. 1), and processing modules that operate on the given information. The collection of processing modules includes a module for evaluating the value of w(k) (equation 3d), a module responsive to the developed w(k) for evaluating $\gamma$ (equation 4a), a module responsive to the developed w(k) for developing the value of x(k+1), a test module a-la circuit 23 in FIG. 1 and a gate similar to gate 33. Of course, the above description is somewhat deceiving in that evaluating w(k) is not at all trivial since it involves developing the inverse $(AD_{x(k)}^2 A^T)^{-1}$. Nevertheless, such modules are available. One is described, for example, in U.S. patent application titled "Preconditioned Conjugate Gradient System optimization", Ser. No. 07/094631, filed Sep. 4, 1987.

PRIOR ART DIFFICULTIES

The most prevalent formulation of control tasks in stochastic systems is as "minimum fuel" problems because, as indicated above, it allows the use of Kalman Filter techniques to solve the controller task as well as the observer task. Still, there is difficulty in applying even this approach to large scale systems. As the size of the problem increases, the number of possible state increases rapidly. The consequent need to store all of the costs overloads the computational apparatus.

Another difficulty is that the parallelism between the conventional Kalman filter observer and the controller is lost when one chooses a performance criterion other than the quadratic one. That is a substantial difficulty because in industry there are many control problems that neither lend themselves to, nor advantageously should, be modeled with a quadratic cost function. "Minimum time" problems, for example, form one class of such control problems. Unlike "minimum energy" problems where the objective is to conserve fuel, or energy, the objective in "minimum time" problems is to reach the desired terminal state of the system under control in the least possible time. A specific example of a "minimum time" problem is the flight control of a military missile. Typically, it is more important for the missile to reach its target in the minimum possible time than to conserve fuel.

In light of these difficulties and the aforementioned developments in linear programming, it makes little sense to force an otherwise LP problem to a QP form just so that a Kalman filter can be used as a controller. To do so means to suffer computationally and to obtain less than the best results. Rather, it seems more appropriate to find a computationally efficient approach to the controller design that directly utilizes the inherently simpler properties of LP. In particular, it seems appropriate to take advantage of the insights offered by the Karmarkar algorithm in Kalman filter applications, and vice versa.

SUMMARY OF THE INVENTION

Our invention makes use of the conceptual and computational similarities between the Karmarkar method as described in U.S. Pat. No. 4,744,028, issued May 10, 1989 and the Kalman filter by developing a controller system that is capable of handling the observer function, the minimum time controller function and the minimum energy controller function.

The system includes an element that has the computational structure of a Kalman filter but the inputs of this element are qualitatively controlled to deliver the desired results to the remaining computation elements. For example, as a controller for an LP control task, our system performs iterative computations in accordance with the interior point affine scaling algorithm. The "dual vector" of the affine scaling algorithm is computed in the Kalman filter structure element by applying information to it as if its task were to estimate the states of a system whose observable output is $D_{x(k)}c$, the input is O, the R covariance matrix is close to zero, the transition matrix is I and the matrix that describes the relationship between the measurable parameters and the observable output is $A^T D_{x(k)}$. Different controls applied to the Kalman filter structure element (and to the other elements of our system) yield control signals for QP control tasks.

DETAILED DESCRIPTION

Figure 1:
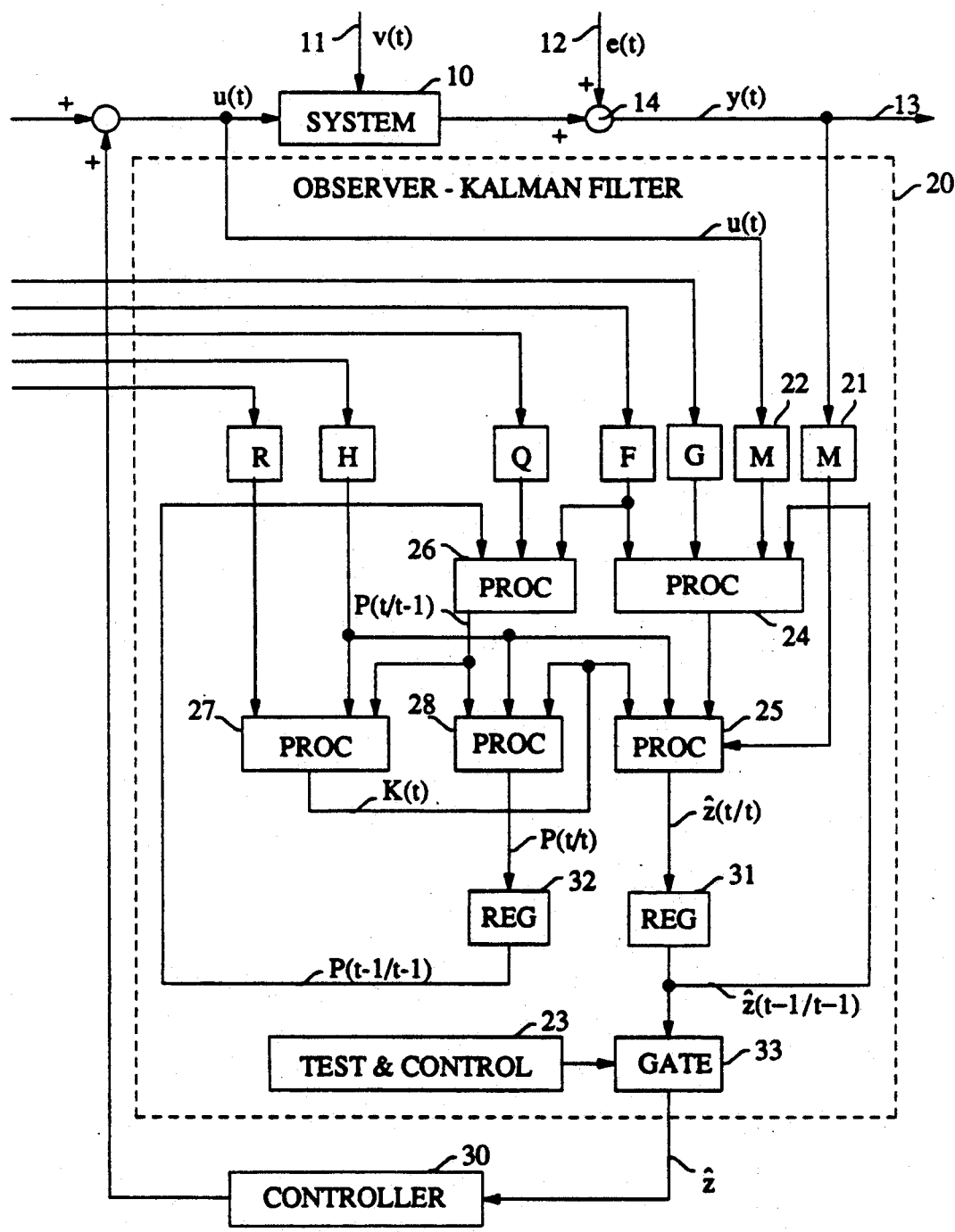
FIG. 1 depicts a block diagram of an observer/controller setup as it is commonly employed to control a system in a stochastic environment.

A careful review of the process by which the Kalman filter develops the state estimates reveals a number of intriguing similarities between itself and the affine scaling algorithm. Specifically, it can be shown that, in the affine scaling algorithm, the value of w(k) in equation 3(d) is a least squares solution. Thus, the developed value of the dual vector w(k) is one that minimizes $\| (AD_{x(k)})^T w(k) - D_{x(k)}c \|^2$. Correspondingly, it can be shown that the state vector estimate in a Kalman filter arrangement $\hat{z}(t)$ is a least square estimate of the state vector z(t), where z(t) is the true state vector and $\hat{z}(t)$ is the filtered state vector. That is, the developed value of $\hat{z}(t)$ is one that minimizes $\| z(t) - \hat{z}(t) \|^2$.

Question: if it is assumed that the dual vector w(k) is really the estimate of the state vector of some hypothetical system, can w(k) in each affine scaling iteration be evaluated by means of a Kalman filter? We first recognized that at each iteration of the affine scaling algorithm the value of w(k), though unknown, is unique and fixed. Placing this in a Kalman filter environment, it means that if w(k) corresponds to the state (z) of some hypothetical system, it must be one that is *static*. In other words, we discovered that w(k) can be obtained from a Kalman filter that operates on a hypothetical system whose state transition matrix F is equal to I and the input (u) is 0, so that at all Kalman filter iterations, t, the state vector of the hypothetical system, w(t), per equation (2a), is constant; i.e., $$w(t) = w(t-1). \tag{5a}$$

We also discovered that equation (4) can be rewritten as $$D_{x(k)}c = D_{x(k)}A^T w(k) - \frac{\gamma}{\alpha} D_{x(k)}^{-1} [x(k+1) - x(k)]. \quad (5b)$$

and in this form, equation (5b) corresponds to equation (1b) when the following variable substitutions are made:

$$y(t) \rightarrow D_{x(k)}c \quad (6a)$$

$$H \rightarrow D_{x(k)}A^T \quad (6b)$$

$$z(t) \rightarrow w(k) \quad (6c)$$

and $$e(t) \rightarrow \frac{\gamma}{\alpha} D_{x(k)}^{-1} [x(k+1) - x(k)]. \quad (6d)$$

With these substitutions in place, various conceptual and computational parallelisms between the two techniques can be brought to light.

ENVIRONMENT OF OPERATION

The Kalman filter (Kalman system) operates in a stochastic environment, while the affine scaling algorithm (Affine system) works essentially in a deterministic framework.

GEOMETRIC INTERPRETATION

Figure 2:
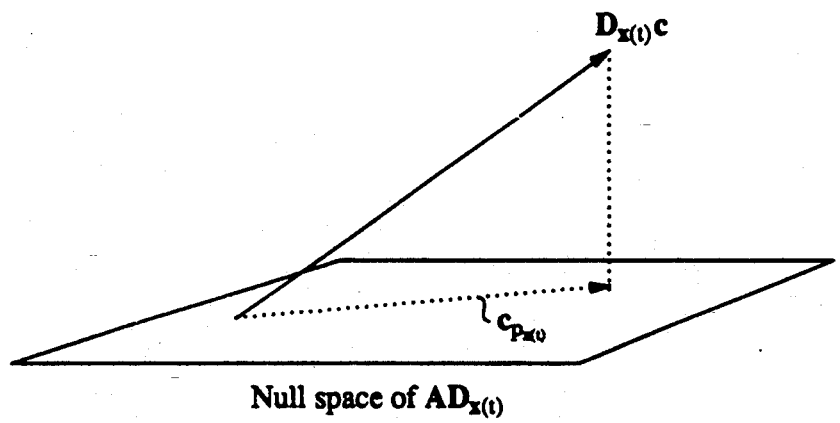
FIG. 2 illustrates the geometric interpretation of the Kalman filter and the affine scaling algorithm and their conceptual similarities.
Figure 2:
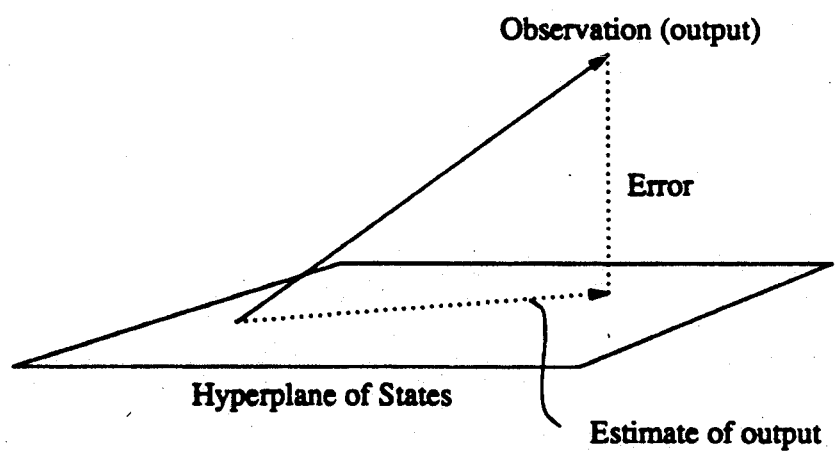

The Affine system projects the weighted cost vector (weighted gradient of the objective function $D_{x(k)}c$) onto the null space of the weighted constraint set AD, per equation (5b). The Kalman system projects the measurement vector y(t) onto the hyperplane which spans the sets of state vectors, per equation (1b). FIG. 2 presents a pictorial representation of this correspondence.

MEASUREMENTS (OBSERVATIONS)

The Kalman system estimates the states of the stochastic system on which it operates from the measurements of the noisy output of the system, y(t). The Affine system derives the information from the weighted gradient of the cost function $D_{x(k)}c$. Since c is a constant, the only variable is $D_{x(k)}$, or x(k) itself, which essentially contains the entire information.

OPTIMAL ESTIMATES

The Kalman system computes the states z(t) of a system in the minimum variance sense from the observations. The Affine system also computes the dual vector w(k) in the least squares sense, from the observation (which is the current interior feasible point, x).

SOURCES OF INFORMATION

Both the Kalman system and the Affine system can be considered as predictor-corrector mechanisms. That is, they start at some point and move towards optimality in steps by predicting the next point from the information that is currently available. As far as the Kalman system is concerned, the next estimate of states is based on the "residuals" defined as $$w'(t) = y(t) - H\hat{z}(t), \quad (7)$$

(see equation 2d). For the Affine system, the next direction of move is based on "reduced cost vector", which in the transformed space is defined as:

$$r_x(t) = c_x(t) - A_x(t)^T w(t) \quad (8)$$

OPTIMALITY CRITERIA

For the Kalman system, the optimality conditions are given by the zero mean of residuals and the statistical orthogonality (statistical independence) between the residuals vector and the observation vector. Likewise, for the Affine system the conditions of optimality are the reduced costs which are greater than or equal to zero (dual feasibility) and the geometrical orthogonality between the reduced costs vector and the current interior point vector (complementary slackness).

Stated simply, with proper inputs, the filtered state vector developed by a Kalman filter is equal to the dual vector of the affine scaling algorithm.

Figure 3:
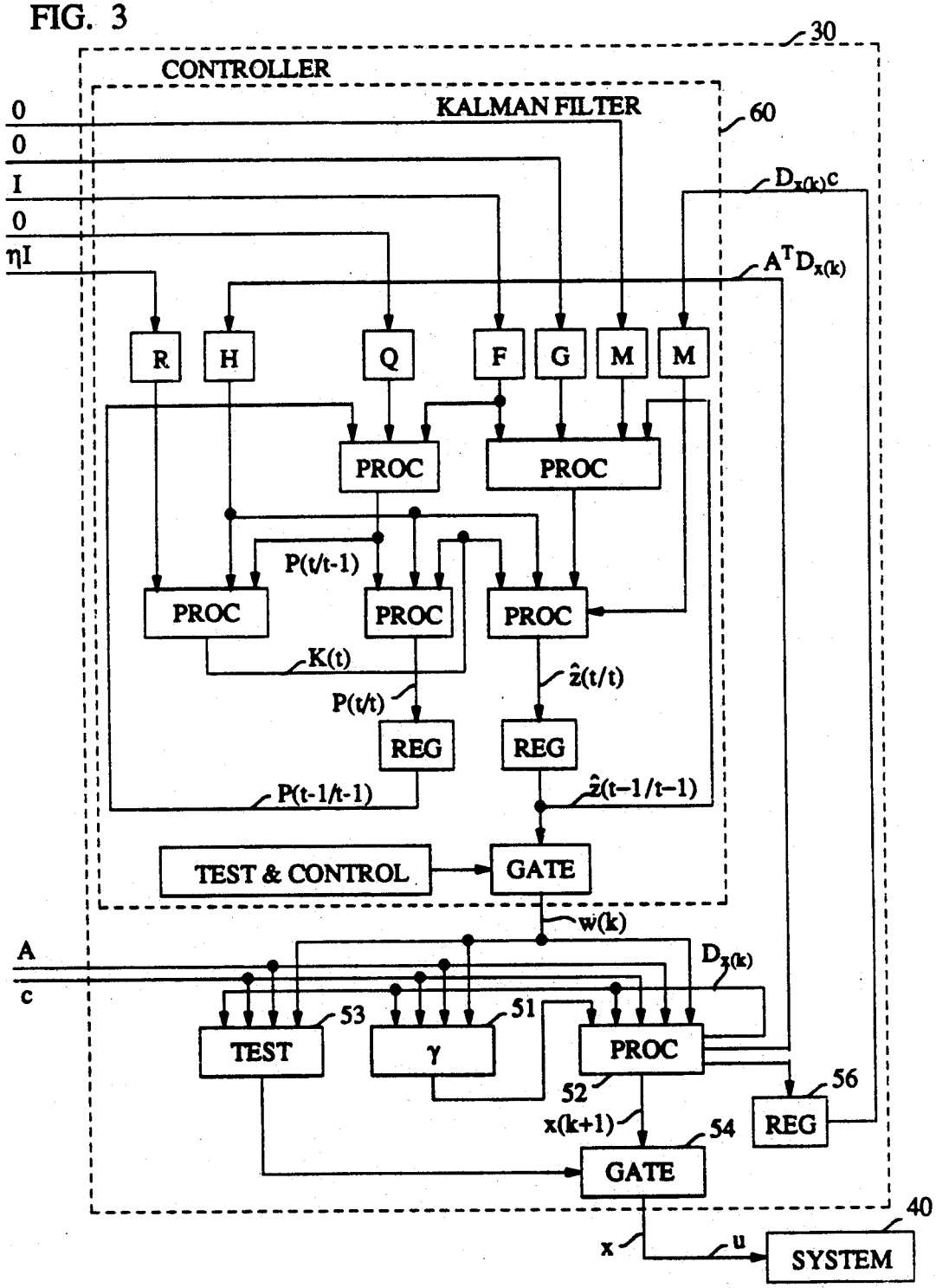
FIG. 3 shows a block diagram of a feed-forward Kalman filter-based controller of a system whose operations are optimized in accordance with a linear cost function.

In light of the above discovery, implementation of the affine scaling LP algorithm (linear constraints and a linear cost function) can be carried out with the aid of a Kalman filter. FIG. 3 presents an illustrative block diagram of this implementation.

In FIG. 3, the system whose operation is to be optimized is depicted by block 40. As in FIG. 1, system 40 may be any commercial or industrial system that utilizes resources in the course of its operation and that is characterized by an expense that is involved with such utilizing of resources. The objective, of course, is to reduce the expenses in accordance with a cost function that is characteristic of system 40.

In accordance with the affine scaling algorithm and the arrangement depicted in FIG. 3, the controller that sends commands to system 40 is a feed-forward controller. It does not have a feedback path to allow controlling of system 40 based on its present state. Of course, inasmuch as the interior point method invented by Karmarkar requires an initial, feasible, starting point, the present operating point of system can be fed to the controller to serve as that initial, feasible, starting point. This may speed the computations for developing the optimizing control signals. Thus, the FIG. 3 embodiment is simply a realization of the affine scaling optimization algorithm for an LP problem associated with a non-stochastic system that is controlled in a feed-forward manner.

In FIG. 3, the LP affine scaling algorithm controller of system 40 comprises blocks 60 and 51–56. More specifically, block 60 in FIG. 3 develops the dual vector w(k) that corresponds to equation (3d). Block 51 computes the value of $\gamma$ based on the value of w(k), A, $D_{x(k)}$ and c in accordance with equation (4a). Processor 52, responsive to w(k), $\gamma$, c, A, and $D_{x(k)}$ develops the next value, x(k+1), in accordance with equation (4). It also develops the diagonal matrix for this new value of x(k+1), multiplied by the cost vector c, and stores that value in register 56 for the next iteration as an input to block 60. Block 53 performs the test of equation (4c) based on the value of w(k), A, c and $D_{x(k)}$, and it determines whether the iterations that encompass blocks 60, 51, 52, and 56 should continue. When block 53 determines that additional iterations are not necessary, gate 54 is enabled to allow the value of the vector x to be applied to system 40.

In accordance with the principles of our invention, block 60 develops the dual vector of w(k) with a Kalman filter that is identical in structure to the filter described in FIG. 1. The difference lies in the fact that the Kalman filter is made to estimate the state of a hypothetical system or, more particularly, the difference lies in the signals that are applied to the Kalman filter of FIG. 3. Specifically, the input to the blocks that maintain the R matrix is $\eta I$, where $\eta$ is a selected constant close to 0 (to insure computational stability). The input to the block that maintains the Q matrix is 0. The input to the block that maintains the H matrix that corresponds to $A^T D_{x(k)}$, and the input to the block that maintains the F matrix is I. Also, either the input to the block that maintains the G matrix is 0, or the input to the memory that receives the input signal u(t) in FIG. 1 is 0 (or both), and the input to the memory that received the observed output signal y(t) in FIG. 1 is $D_{x(k)}c$.

One can purchase a Kalman filter and apply thereto the signals specified above. However, it should be realized that one does not have to use the "full fledged" Kalman filter in connection with the FIG. 3 structure. Since a number of the inputs are trivial (0 or I), a number of the processors in block 60 of FIG. 3 actually can be dispensed with and the complexity reduced. Viewed differently, equations (2a) through (2f) can be simplified substantially when G=0, Q=0, u=0 and F=I.

The above describes the use of a conventional Kalman filter with appropriate modifications to its inputs, in combination with other elements, to realize the affine scaling algorithm for solving linear programming optimization tasks. Similar results hold true for optimization tasks where the cost function is quadratic. This follows from the fact that in a copending application, Ser. No. 237,264, filed Aug. 28, 1988, and in a publication in the 13th International Math. Symp., titled "A New Karmarkar-Based Algorithm for Optimizing Convex, Non-Linear Cost Functions with Linear Constraints", Tokyo, Japan, 1988, Aug. 29-Sept. 2, an algorithm to solve QP (quadratic programming) problems using affine scaling was disclosed. This QP algorithm can be summarized as follows A "minimum fuel" problem can be posed as a QP problem to minimize $\frac{1}{2}x^T\Omega x - c^T x$ subject to a set of linear constraints $$Ax = b$$

where $x \geq 0$, $\Omega$ is a positive definite or semi-definite matrix, and c, A, and b are the same as in the LP problem. When the problem is posed in this manner, the QP algorithm proceeds as follows.

1. At each iteration k, where a feasible solution x(k) is known, compute the descent direction by using $$\delta x_p = [I - TA^T(ATA^T)^{-1}A]T(\Omega x(k) - c) \quad (9a)$$

where $$T = (\Omega + D_{x(k)}^{-2}) \quad (9b)$$

$D_{x(k)}$ is the diagonal matrix containing the components of x(k).

2. Compute $\alpha = \min(\alpha_1, \alpha_2)$, where $$\alpha_1 = \frac{\beta}{\max_i [\delta x_{pi}/x_i(k)]}, \quad (9c)$$

$\beta$ being a selected constant between 0 and 1, and $$\alpha_2 = \frac{[\delta x_p^T(\Omega x(k) - c)]}{[\delta x_p^T \Omega \delta x_p]}. \quad (9d)$$

3. Perform the translation $$x(k+1) = x(k) - \alpha \delta x_p. \quad (9e)$$

4. IF $$\max_i |\delta x_{pi}| \leq \epsilon$$

(where $\epsilon$ is chosen small positive number)
THEN stop
ELSE go to step 1, with k=k+1.

Again, we discovered that $\delta x_p$ of equation (9a) can be written as $$\delta x_p = L[g(k) - (AL)^T w(k)] \quad (10a)$$

where $$w(k) = (AT^T)^{-1}AT(\Omega x(k) - c) \quad (10b)$$

and $$g(k) = L^T(\Omega x(k) - c), \quad (10c)$$

and that allows one to formulate the state space equations corresponding to this QP algorithm for Kalman iterations. In the above, the matrix L is such that $T = LL^T$. As before, it can be shown that a dual vector w(k) can be obtained for each iteration k of the affine scaling algorithm from the filtered state estimate of a Kalman filter operating on a hypothetical system whose state, w(t), is fixed within the Kalman iterations, t; to wit, $$w(t) = w(t-1). \quad (11a)$$

The state of the hypothetical system corresponds to the dual vector of the affine scaling algorithm, because the function $$g(t) = AL^T w(t) + e(t), \quad (11b)$$

holds true, where $$g(t) = L^T(\Omega x(k) - c), \quad (11c)$$

and $$e(t) = \frac{1}{\alpha} L^{-1}[x(k) - x(k+1)]. \quad (11d)$$

It should be noted that both g and T change from one iteration of the affine scaling algorithm to the next (i.e., as k increments) because, as indicated by equation (9b), T is a function of $D_{x(k)}$.

Thus, by replacing $$w \rightarrow z \quad (14a)$$

$$F \rightarrow I \quad (14b)$$

$$T \rightarrow (AL)^T \quad (14c)$$

$$y(t) \rightarrow L^T(\Omega x(k) - c) \quad (14d)$$

$$R \rightarrow \eta I \quad (14e)$$

and $$\eta \rightarrow \text{small positive number to insure computational stability.} \quad (14f)$$

The QP algorithm can be posed as a Kalman filtering problem.

As already indicated earlier one needs a routine for the matrix inversion of the step expressed by equation 2(c). The same routine can be used to obtain T, L, and $L^{-1}$ and, hence, no special routines are necessary for the QP implementation that employs a Kalman filter. In short, the controller depicted in FIG. 3 is applicable to optimization of a system 40 where the cost function is linear; and the controller depicted in FIG. 4, which is essentially identical to that of FIG. 3 but with different inputs, is applicable to optimization of a system 40 where the cost function is quadratic.

HARDWARE REALIZATIONS

Figure 4:
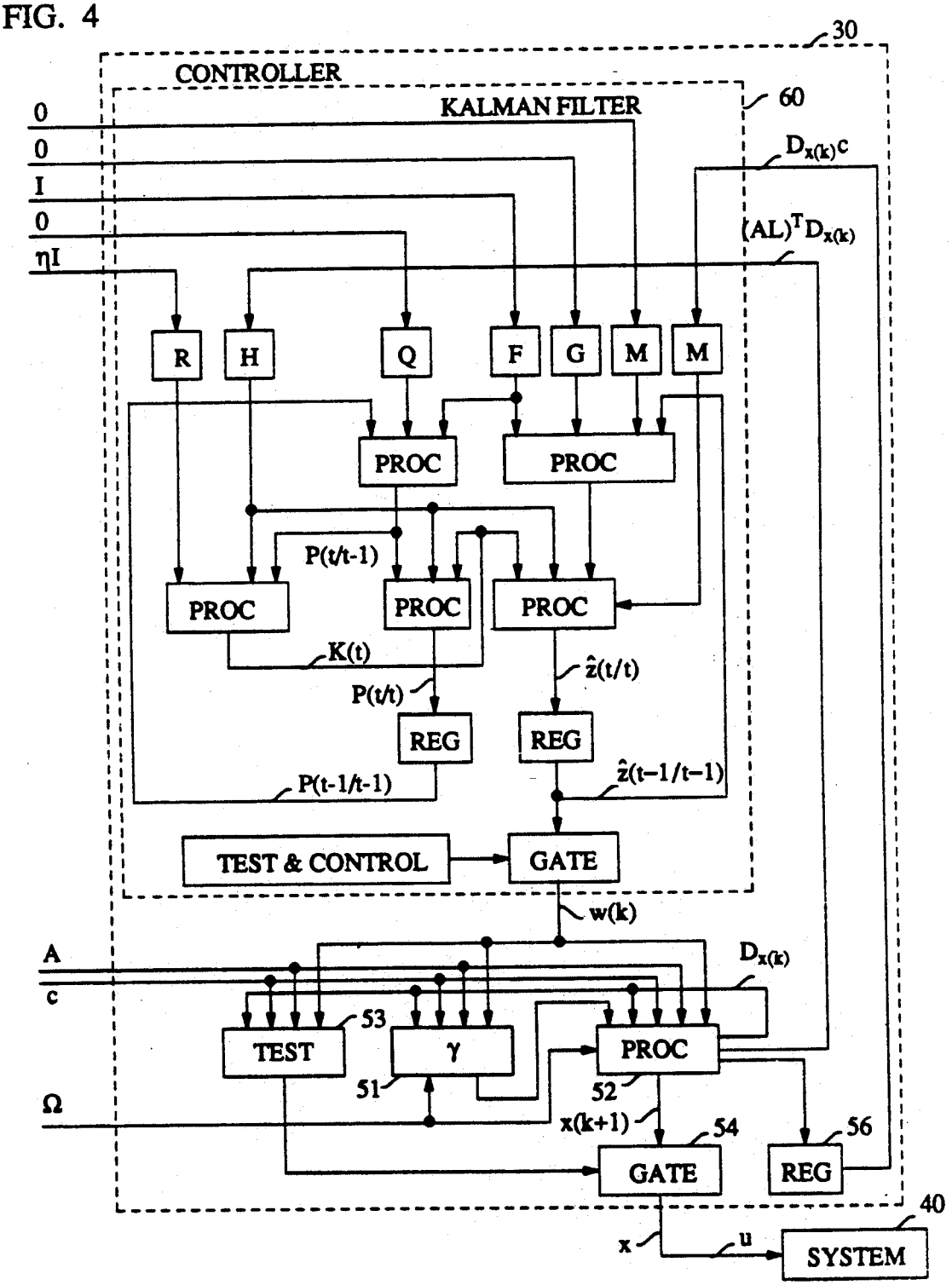
FIG. 4 shows a block diagram of a feed-forward Kalman filter-based controller of a system whose operations are optimized in accordance with a quadratic cost function.

The controller of FIGS. 3-4 is shown to include a Kalman filter and a number of additional components. Although it is presumed that in realizing the controller artisans would simply purchase a Kalman filter, FIGS. 1-4 present sufficient information to allow a skilled artisan to create the filter "from scratch". That is, as suggested earlier, each of the processors in the Kalman filter can be created for the specific computational function that it needs to perform or, alternatively, each of the processors can be realized with a general purpose processing element, such as a microprocessor, with attendant memory and stored program control. The same applies to the processors outside the Kalman filter that are included in the controller of FIG. 3.

Indeed, the entire FIG. 3 controller can be implemented in a single general purpose computer, under program control, and the program control can even include a switch function to allow the processor to A. execute the Kalman filter function per equation (6), together with the remainder of the affine scaling algorithm—to solve an LP problem, or B. execute the Kalman filter function per equation (14), together with the remainder of the affine scaling algorithm—to solve a QP problem.

Figure 5:
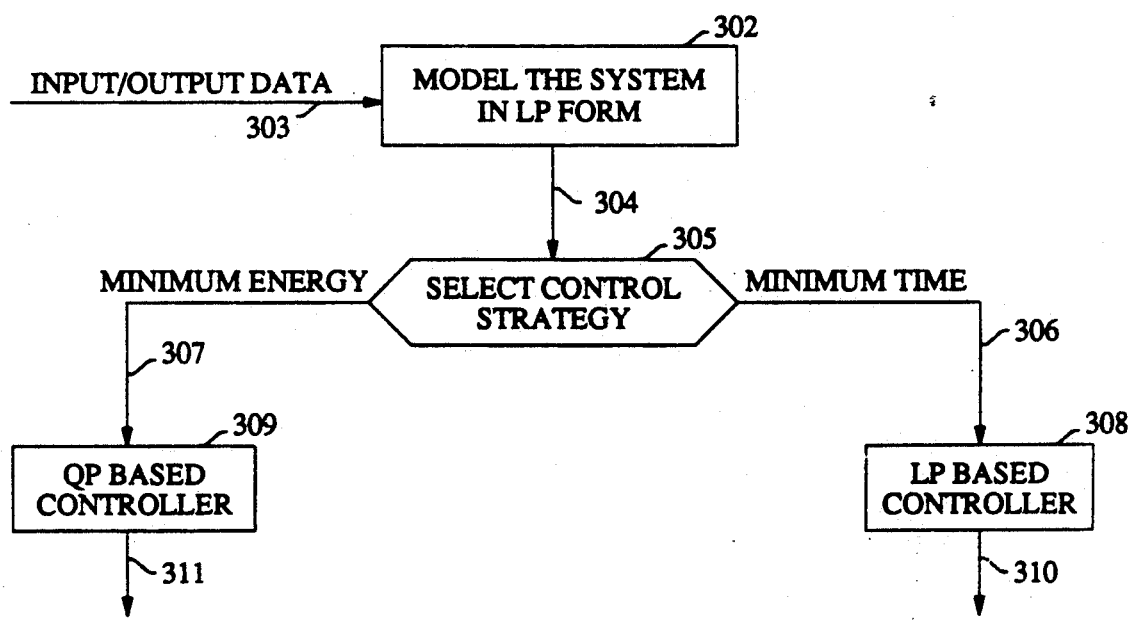
FIG. 5 is a flow chart which describes the modeling and control of a general system or process.

The process of controlling such a general purpose processor is shown in the form of a flow chart in FIG. 5. The first step (302) is to model the system or process to be controlled to develop the A, b, and c information. The modeling process is, of course, not part of the direct process of control. It is an "off line" step that is the predicate to the control process. Once the modeling part is done, decision process 305 determines whether a minimum time (306) or a minimum energy (307) control strategy will be employed, and applies the developed states to process 308 or to process 309. In process 308 the LP based controller of equation (6) is implemented, and in process 309 the QP based controller of equation (14) is implemented.

Figure 6:
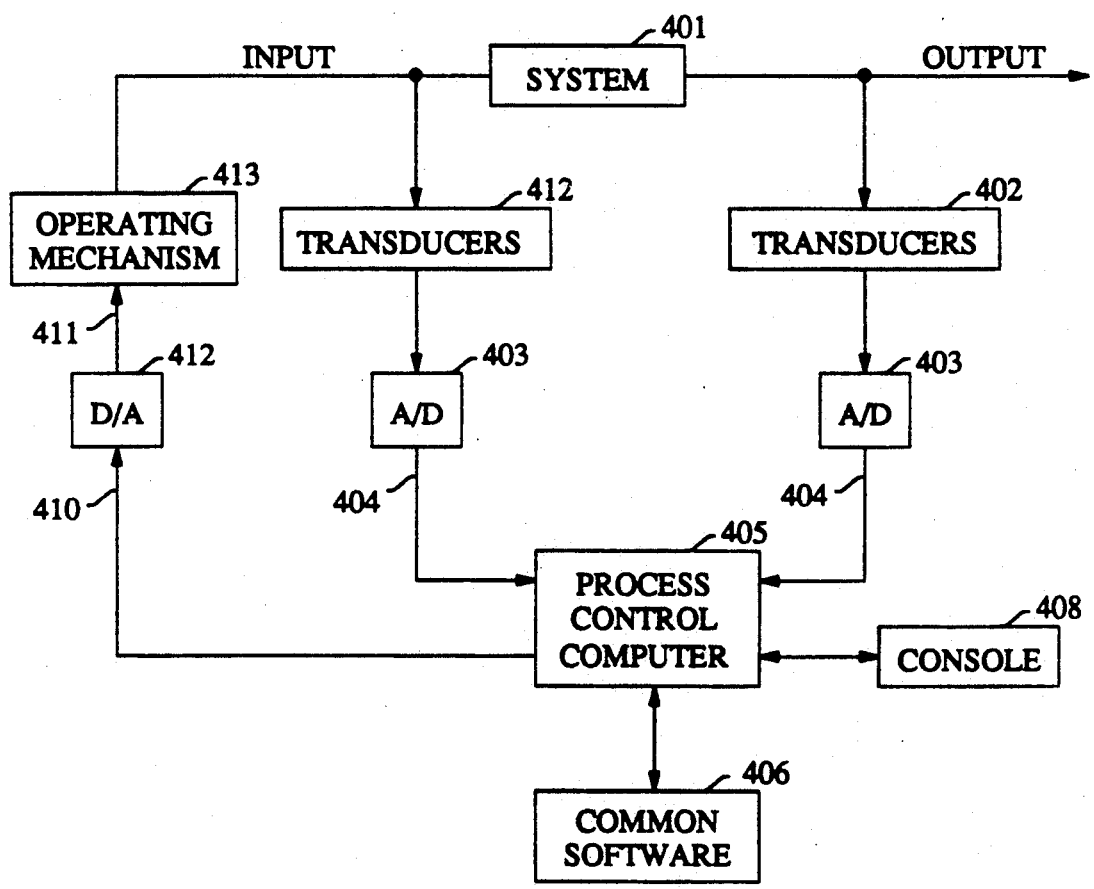
FIG. 6 is the block diagram of a three-in-one observer/controller apparatus.

FIG. 6 illustrates a unified three-in-one observer/controller system in accordance with the principles of our invention.

Block 401 is the system or process to be controlled. Blocks 402 and 412 include appropriate transducers which generate electrical signals corresponding to the input and output of the system, respectively. These electrical signals are often analog in nature and, hence, blocks 403 are provided, which are analog-to-digital converts that make these signals ready for use by a digital computer. Signal lines 404 carry this digital data to element 405, which is a digital computer.

Upon the arrival of the data, computer 405 invokes the Kalman filter by setting appropriate parameters in the common software 406 residing in the memory of the computer, and estimates the states of the system. Setting of the parameters in software 406 is tantamount to applying the appropriate inputs to the Kalman filter, as depicted in FIGS. 3 and 4. The information on the states estimated by computer 405 is displayed on the console 408 of the computer for human monitoring. The console is also used to provide input to computer 405 on the type of control action to be taken (minimum time or minimum energy) and the corresponding parameters (desired output, control horizon, penalty for deviating from desired output goal, limits on control input, etc.) to be used in deploying the selected control strategy. Once this information is provided to computer 405, the appropriate parameters in the common software 406 are set, the processes described in connection with the selected control strategy are executed, and the appropriate control signals 410, in the form of digital data, are developed. This data is then converted to analog signals 411 with the help of digital-to-analog converters 412. These analog signals drive corresponding operating mechanisms 413 (for example valves of a chemical reactor) to provide actual inputs to the system or process to be controlled.

We claim:

1. Apparatus comprising:

a filter having first and second input ports an output port, which filter develops at said output port an estimate of the state of a system whose observable output corresponds to the input signal applied to said first input port, and whose output matrix, which relates said observable output to the current state of said system, corresponds to the input signal to said second input port;

a combiner responsive to said output port of said filter, to a first input port of said apparatus, and to a second input port of said apparatus, where said first input port of said apparatus is adapted to receive a collection of signal elements representative of a matrix A, said second input port of said apparatus is adapted to receive a collection of signals representative of a vector c, and said combiner develops an output signal $\gamma$ that is proportional to $c - A^T w$, where w is the signal at said output port of said filter, where $A^T$ is the transpose of of matrix A and $A^T w$ is the product of the matrix $A^T$ by the vector w;

a processor responsive to said outpput port of said filter, to said first input port of said apparatus, to said second input port of said apparatus, and to the signal $\gamma$, for developing a replacement control signal candidate, $x(k+1)$, based on said $\gamma$, A, c, and a current control signal candidate, $x(k)$, and for incrementing k, where k is an integer, means for developing a signal $D_{x(k)}$, a signal $D_{x(k)}c$, and a signal $A^T D_{x(k)}$, where $D_{x(k)}$ represents a diagonal matrix with the values of $x(k)$ on the diagonal;

means for applying said $D_{x(k)}c$ signal to said first input port of said filter, and said $A^T D_{x(k)}$ signal to said second input port of said filter; and means for applying said x(k) signal to an output port of said apparatus.

2. The apparatus of claim 1, further comprising a controllable system whose operational costs are controlled through a set of control signals applied to control ports of said controllable system, having said control ports of said controllable system responsive to said x(k) signal developed at said output port of said apparatus, with the A matrix input signal applied to said apparatus set to correspond to a set of constraint coefficients under which said controllable system operates, and the c input signal applied to said apparatus set to correspond to cost coefficients applicable to said operational costs of said controllable system.

3. The apparatus of claim 2, further comprising an observer system responsive to observable outputs of said controllable system for determining the values of said A input signal.

4. The apparatus of claim 1 wherein said filter further comprises a third filter input to which is applied covariance information pertaining to a measurement noise in measuring said observable output of said system.

5. Apparatus for developing control signals to minimize the operational cost, $c^Tx$, of a given system, where c is a vector of cost coefficient signals for said given system, superscript T represents the transpose and x is a vector of controllable parameters of said given system which affect said operational cost, and where said given system is characterized by $Ax=b$, where A is a matrix of constraint signals and b is a vector of constraint limits, Comprising:

a processor for estimating a state w(k) of a second system, k being a repetition index, said processor having a first input port for applying to said processor observable outputs of said second system, a second input port for applying to said processor information relating said state of said second system to said observable outputs of said second system, with said processor receiving at said first input port signals that correspond to $D_{x(k)}c$, where $D_{x(k)}$ is a diagonal matrix with the elements of a given vector x(k) on the diagonal, and receiving at said second input port signals that correspond to $A^TD_{x(k)}$, first means for combining said developed w(k) of said processor and said c, A, and $D_{x(k)}$ to form a constant $\gamma$ signal;

second means for combining said developed $\gamma$ signal, said x(k), $D_{x(k)}$, c, and A to form a new given vector x(k) for a next repetition; and means for testing said state, w(k), developed by said processor to determine whether to inhibit said next repetition and apply the given vector x(k) that was last developed by said second means for combining to an output port of said apparatus.

6. The method of claim 5 wherein said new given vector x(k) for the next iteration, that is x(k+1), is developed in accordance with the expression $$x(k + 1) = x(k) - \frac{\alpha}{\gamma} D^2_{x(k)}(c - A^Tw(k))$$

where $\alpha$ is a selected constant greater than 0 and less than 1.

7. The method of claim 5 wherein said $\gamma$ signal is developed in accordance with the expression $$\gamma = \max_i [e_i D_{x(k)}(c - A^Tw(k))]$$

where $e_i$ is the unit vector and where i is an integer that designates a particular element in vector $e_i$.

8. An arrangement comprising:

a physical enterprise characterized by an operational cost $c^Tx$, which enterprise operates under a set of constraints A and constraint limits b such that $Ax=b$, where c are cost coefficients, superscript T represents the transpose and x is a set of controllable parameters of said enterprise that interact with said coefficients to affect said operational cost; and a controller coupled to said enterprise for minimizing said operational cost, where said controller includes A. a processor for estimating a state w(k) of a system characterized by $$z(t+1)=Fz(t)+Gu(t)+v(t)$$

$$y(t)=Hz(t)+e(t)$$

where
z(t) is a state vector of said system,
F is a state transition matrix of said system,
G is an input matrix of said system,
H is an output matrix of said system,
u(t) is a control input vector of said system,
v(t) is a system noise of said system,
y(t) is a measured output of said system, and
e(t) is measurement noise of said system,
where t is an iteration index of said processor and where said processor is arranged to receive a signal corresponding to $A^TD_{x(k)}$ for said output matrix H and a signal corresponding to $D_{x(k)}c$ for said measured output y(t), to develop thereby a state estimate of said system corresponding to said vector w(k), where $D_{x(k)}$ is a diagonal matrix with the elements of vector x(k) on the diagonal and x(k) is a given potential vector x of said enterprise, and k is an iteration index of said controller;

B. means responsive to said w(k), said c and to said A to develop a constant $\gamma$ and select a constant $\alpha$ between 0 and 1.0;

C. means for combining said x(k), $D_{x(k)}$, c, A, $\gamma$ and $\alpha$ to form a new potential vector x(k) of said system;

D. means for applying information about said new potential vector of said system, x(k), to said processor;

E. means for testing said state vector w(k) developed by said processor to inhibit said means for applying so that said information is not applied to said processor, and to sending the last developed vector x(k) to said enterprise to control said operational cost of said enterprise, when a selected threshold is exceeded.

9. An observer/controller apparatus for developing control signals to minimize operational cost, $c^Tx$, of a given system, where c is a vector of cost coefficient signals for said given system, superscript T represents the transpose and x is a vector of controllable parameters of said given system which affect said operational cost, and where said given system is characterized by $Ax=b$, where A is a matrix of constraint signals and b is a vector of constraint limits, comprising:

an observer including a Kalman filter responsive to an observable output of a given system to develop an estimate of the operational state of said given system, and a controller responsive to said observer, wherein said controller includes a second Kalman filter for estimating the state, w, of a second system whose observable output which is applied to said second Kalman filter corresponds to $D_z$, and whose output matrix, which relates said state of said second system to said observable output of said second system is $D_z A^T$, where $D_z$ is a diagonal matrix with the elements of a vector z on the diagonal;

means responsive to said w, said c and to said A to develope a constant $\gamma$ and a constant $\alpha$ between 0 and 1.0;

means for combining said z, $D_z$, c, A, $\gamma$ and $\alpha$ to form a vector z';

means for a) assigning z' to z, b) developing said observable output, and c) applying said observable output to said second Kalman filter;

means for testing said state w developed by said second Kalman filter to determine when said means for applying should cease applying said observable output to said second Kalman filter and when said z' is assigned to said controllable parameters x; and means for transmitting said controllable parameters x to said given system.

10. Apparatus for developing control signals to minimize operational cost, $\frac{1}{2}x^T\Omega x - c^T x$, of a given system, where c is a vector of cost coefficient signals for said given system, superscript T represents the transpose and x is a vector of controllable parameters of said given system which affect said operational cost, $\Omega$ is at least a semi-positive definite matrix, and where said given system is characterized by $Ax=b$, where A is a matrix of constraint signals and b is a vector of constraint limits, comprising:

a processor for estimating a state w(k) of a second system, k being a repetition index, said processor having a first input port for applying to said processor observable outputs of said second system, a second input port for applying to said processor information relating said state of said second system to said observable outputs of said second system, with said processor receiving at said first input port signals that correspond to $D_{x(k)}c$, where $D_{x(k)}$ is a diagonal matrix with the elements of a given vector x(k) on the diagonal, and receiving at said second input port signals that correspond to $(AL)^T D_{x(k)}$, where L is such that $LL^T = (\Omega + D_{x(k)}^{-2})$, means for combining said developed w(k) of said processor and said c, A, $\Omega$, and $D_{x(k)}$ to form a constant $\gamma$ signal;

means for combining said developed $\gamma$ signal, said x(k), $D_{x(k)}$, c, and A to form a new given vector x(k) for a next repetition; and means for testing said state, w(k), developed by said processor to determine whether to inhibit said next repetition and apply the given vector x(k) that was last developed by said means for combining to an output port of said apparatus.

11. A method for controlling a physical system to reduce operational costs of said system, as measured by the cost function $c^T x$, where c is a vector of cost coefficients, superscript T represents the transpose and x is a vector that represents the controllable parameter values of said system, which method includes the steps of A) receiving signals representative of the characteristics of said system that provide a measure of constraint relationships A that must be satisfied within said system in relation to constraint limits b that are applicable to said system, B) developing a control signals vector x based on said received characteristics of the system by iteratively developing a candidate control signals vector x(k), k being the iteration index, through the iterative steps 1) developing a dual vector w(k), 2) computing a scalar multiplier $\gamma$ responsive to the developed dual vector, 3) developing a new candidate for vector x, x(k+1), that corresponds to x(k) modified in accordance with said dual vector w(k) and scalar multiplier $\gamma$, and 4) incrementing k and returning to step 1 when the primary termination test $$(c - A^T w(k)) \geq 0$$

and $$x(k) \cdot (c - A^T w(k)) \geq 0$$

fails, and assigning the last-developed x(k+1) signals vector to said x signals vector and proceeding to step C when said primary termination test does not fail, and C) applying said x signals vector to control inputs of said system, The improvement comprises initializing an iteration index t to 1, a covariance measure P(0/0) to mI, where m is a large positive real value and I is the identity matrix, and a state estimate $\hat{z}(0/0)$ to a preselected value, and developing said dual vector w(k) by carrying out the computation steps of:

Computing a Kalman gain matrix $$K(t) = P(t-1/t-1)H^T(HP(t-1/t-1)H^T + \eta I)^{-1},$$

developing an estimate of a filtered state $$\hat{z}(t/t) = \hat{z}(t-1/t-1) + K(t)[D_{x(k)}c - H\hat{z}(t-1/t-1)]$$

where $H = A^T D_{x(k)}$, developing an updated value of the covariance measure $$P(t/t) = [I - K(t)]P(t-1/t-1)$$

and incrementing t and returning to said computing of a Kalman gain matrix when a secondary termination test is not met, and assigning the last developed z(t/t) to said dual vector w(k) when said secondary termination test is met, said secondary termination test being met when the expected value of $[D_{x(k)}c - H\hat{z}(t-1/t-1)]$ is 0 and the expected value of $[D_{x(k)}c - H\hat{z}(t-1/t-1) \cdot \hat{z}(t/t)]$ is 0.

12. A method for controlling a physical system to reduce operational costs of said system, as measured by the cost function $c^T x$, where c is a vector of cost coefficients, superscript T represents the transpose and x is a vector that represents the controllable parameter values of said system, which method includes the steps of A) receiving signals representative of the characteristics of said system that provide a measure of constraint relationships A that must be satisfied within said system in relation to constraint limits b that are applicable to said system, B) developing a control signals vector x based on said received characteristics of the system by iteratively developing a candidate control signals vector x(k), k being the iteration index, through the iterative steps of 1) developing a dual vector signal w(k) corresponding to $(AD_{x(k)}^2 A^T)^{-1} AD_{x(k)}^2 c$ where, $D_{x(k)}$ is a diagonal matrix with the values of x(k) on the diagonal, 2) developing a constant $\gamma$ that corresponds to $$\max_i [e_i D_{x(k)}(c - A^T w(k))]$$

where $e_i$ is the unit vector, 3) developing a new candidate for vector x, x(k+1), that corresponds to $$x(k) - \frac{\alpha}{\gamma} D_{x(k)}^2 (c - A^T w(k))$$

where $\alpha$ is a selected constant greater than 0 and less than 1, and 4) incrementing k and returning to step 1 when the primary termination test $$(c - A^T w(k)) \geq 0$$

and $$x(k) \cdot (c - A^T w(k)) \geq 0$$

fails, and assigning the last-developed x(k+1) signals vector to said x signals vector and proceeding to step C when said primary termination test does not fail, and C) applying said x signals vector to control inputs of said system, the improvement comprises initializing an iteration index t to 1, a covariance measure P(0/0) to mI, where m is a large positive real value and I is the identity matrix, and a state estimate z(0/0) to a preselected value, and developing said dual vector w(k) by carrying out the computation steps of:

Computing a Kalman gain matrix $$K(t) = P(t-1/t-1)H^T(HP(t-1/t-1)H^T + \eta I)^{-1},$$

developing an estimate of a filtered state $$\hat{z}(t/t) = \hat{z}(t-1/t-1) + K(t)[D_{x(k)}c - H\hat{z}(t-1/t-1)]$$

where $H = A^T D_{x(k)}$, developing an updated value of the covariance measure $$P(t/t) = [I - K(t)H]P(t-1/t-1)$$

and incrementing t and returning to said computing of a Kalman gain matrix when a secondary termination test is not met, and assigning the last developed z(t/t) to said dual vector w(k) when said secondary termination test is met, said secondary termination test being met when the expected value of $[D_{x(k)}c - H\hat{z}(t-1/t-1)]$ is 0 and the expected value of $[D_{x(k)}c - H\hat{z}(t-1/t-1) \cdot \hat{z}(t/t)]$ is 0.

* * * * *